US011522271B2

(12) United States Patent
Kim et al.

(10) Patent No.: US 11,522,271 B2
(45) Date of Patent: Dec. 6, 2022

(54) ANTENNA AND ELECTRONIC DEVICE COMPRISING SAME

(71) Applicant: Samsung Electronics Co., Ltd., Gyeonggi-do (KR)

(72) Inventors: Jaehyung Kim, Gyeonggi-do (KR); Donghwan Kim, Gyeonggi-do (KR); Taegyu Kim, Gyeonggi-do (KR); Minseok Park, Gyeonggi-do (KR); Changha Yu, Gyeonggi-do (KR); Jiyeon Yun, Gyeonggi-do (KR); Bumjin Cho, Gyeonggi-do (KR); Donguk Choi, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 12 days.

(21) Appl. No.: 17/058,538

(22) PCT Filed: May 21, 2019

(86) PCT No.: PCT/KR2019/006064
§ 371 (c)(1),
(2) Date: Nov. 24, 2020

(87) PCT Pub. No.: WO2019/225946
PCT Pub. Date: Nov. 28, 2019

(65) Prior Publication Data
US 2021/0218129 A1    Jul. 15, 2021

(30) Foreign Application Priority Data

May 24, 2018    (KR) ........................ 10-2018-0059004

(51) Int. Cl.
*H01Q 1/24*    (2006.01)
*H01Q 1/38*    (2006.01)
(Continued)

(52) U.S. Cl.
CPC ............... *H01Q 1/243* (2013.01); *H01Q 1/38* (2013.01); *H01Q 1/44* (2013.01); *H04B 1/40* (2013.01)

(58) Field of Classification Search
CPC .......... H01Q 1/24; H01Q 1/241; H01Q 1/243; H01Q 1/38; H01Q 1/422; H01Q 1/42; H01Q 1/44; H01Q 1/52
See application file for complete search history.

(56) References Cited

U.S. PATENT DOCUMENTS

2012/0050114 A1    3/2012    Li et al.
2012/0087065 A1    4/2012    Kim et al.
(Continued)

FOREIGN PATENT DOCUMENTS

KR    1020100101312    9/2010
KR    1020120020088    3/2012
(Continued)

OTHER PUBLICATIONS

PCT/ISA/210 Search Report issued on PCT/KR2019/006064, dated Sep. 9, 2019, pp. 5.
(Continued)

*Primary Examiner* — Thai Pham
(74) *Attorney, Agent, or Firm* — The Farrell Law Firm, P.C.

(57) ABSTRACT

According to various embodiments, an electronic device may comprise: a housing comprising a front plate, a rear plate facing in the opposite direction to the front plate, and a side surface member surrounding the space between the front plate and the rear plate, the side surface member comprising a first side surface extending in a first direction and having a first length, a second side surface extending in a second direction perpendicular to the first direction and having a second length larger than the first length, a third
(Continued)

side surface extending in parallel with the first side surface and having the first length, and a fourth side surface extending in parallel with the second side surface and having the second length; a display arranged between the front plate and the rear plate, at least a partial area of the display being exposed through the front plate, the display comprising a conductive plate; a printed circuit board arranged between the display and the rear plate, the printed circuit hoard comprising at least one conductive layer, the conductive plate and the conductive layer being electrically connected to each other; a first conductive pattern arranged between the printed circuit board and the rear plate; a second conductive pattern arranged between the printed circuit board and the front plate and, when seen from above the front plate, between the first side surface of the side surface member and the conductive plate; and a wireless communication circuit electrically connected to the first conductive pattern and the second conductive pattern and configured to transmit and/or receive a signal having a designated frequency. Various other embodiments may be possible.

15 Claims, 10 Drawing Sheets

(51) Int. Cl.
*H01Q 1/44* (2006.01)
*H04B 1/40* (2015.01)

(56) References Cited

U.S. PATENT DOCUMENTS

| | | | |
|---|---|---|---|
| 2012/0223865 | A1 | 9/2012 | Li et al. |
| 2013/0241798 | A1* | 9/2013 | Lee .......................... H01Q 1/50 |
| | | | 343/876 |
| 2015/0070219 | A1 | 3/2015 | Dinh et al. |
| 2016/0079683 | A1* | 3/2016 | Lee ......................... H01Q 5/378 |
| | | | 343/876 |
| 2016/0124396 | A1 | 5/2016 | Choi et al. |
| 2016/0315387 | A1 | 10/2016 | Lee et al. |
| 2017/0207516 | A1* | 7/2017 | Koo ..................... H04M 1/0277 |
| 2017/0250460 | A1* | 8/2017 | Shin ........................ H01Q 21/28 |
| 2019/0281146 | A1* | 9/2019 | Jang ....................... H04M 1/026 |
| 2020/0153115 | A1* | 5/2020 | Yun ....................... H01Q 1/2283 |

FOREIGN PATENT DOCUMENTS

| | | |
|---|---|---|
| KR | 1020130106065 | 9/2013 |
| KR | 1020150068201 | 6/2015 |
| KR | 1020160052253 | 5/2016 |
| KR | 1020170087334 | 7/2017 |
| WO | WO 2018/084327 | 5/2018 |

OTHER PUBLICATIONS

PCT/ISA/237 Written Opinion issued on PCT/KR2019/006064, dated Sep. 9, 2019, pp. 4.
Korean Office Action dated Mar. 22, 2022 issued in counterpart application No. 10-2018-0059004, 22 pages.
KR Notice of Patent Grant dated Aug. 23, 2022 issued in counterpart application No. 10-2018-0059004, 5 pages.

* cited by examiner

ANTENNA AND ELECTRONIC DEVICE COMPRISING SAME

PRIORITY

This application is a National Phase Entry of International Application No. PCT/KR2019/006064, which was filed on May 21, 2019, and claims priority to Korean Patent Application No. 10-2018-0059004, filed in the Korean Intellectual Property Office on May 24, 2018, the entire content of each of which is incorporated herein by reference.

TECHNICAL FIELD

Various embodiments of the disclosure relate to an antenna and an electronic device including the same.

BACKGROUND ART

Portable electronic devices, which are epitomized by smartphones, have been developed such that hardware/software differences between manufacturers have gradually decreased. As a result, electronic devices have been improved not only in terms of performance, but also in terms of user friendliness and design aspect. For example, portable electronic devices tend to be equipped with large-screen touch displays in order to facilitate manipulation and to secure visibility.

DISCLOSURE OF INVENTION

Technical Problem

Portable electronic devices have become slimmer in order to improve design aesthetics and portability, and tend to be equipped with large-screen touch displays (hereinafter, also referred to as "displays") that are large enough to occupy most areas of the front surface of such electronic devices in order to improve manipulation convenience and visibility. Such a touch display may have a conductive plate (for example, a conductive member) disposed on the back surface thereof in order to radiate heat or to block noise. The distance between such a conductive plate and an antenna disposed in the electronic device may be reduced in line with the increasing area of the display, and this may result in degradation of the radiation performance of the antenna. For example, a conductive plate on the periphery of the display may make it difficult to implement an antenna that simultaneously operates in multiple bands (for example, in a low band and in a mid-band) by means of a single conductive pattern (for example, antenna radiator). Even if the antenna operates in a single band, parasitic resonance may be formed by the conductive plate disposed on the periphery, thereby degrading the antenna performance.

According to various embodiments of the disclosure, an antenna and an electronic device including the same may be provided.

According to various embodiments, an antenna formed such that unnecessary parasitic resonance can be excluded, and an electronic device including the same may be provided.

According to various embodiments, an antenna capable of efficiently operating in multiple bands and an electronic device including the same may be provided.

Solution to Problem

According to various embodiments, an electronic device may include: a housing including a front plate a rear plate facing in the opposite direction to the front plate, and a side surface member surrounding a space between the first plate and the rear plate, the side surface member including a first side surface extending in a first direction and having a first length, a second side surface extending in a second direction perpendicular to the first direction and having a second length longer than the first length, a third side surface extending parallel to the first side surface and having the first length, and a fourth side surface extending parallel to the second side surface and having the second length; a display arranged between the front plate and the rear plate, having at least a partial region exposed through the front plate, and including a conductive plate; a printed circuit board arranged between the display and the rear plate and including at least one conductive layer, the at least one conductive layer being electrically connected to the conductive plate; a first conductive pattern arranged between the printed circuit board and the rear plate; a second conductive pattern arranged between the printed circuit board and the front plate and, when viewed from above the front plate, between the first side surface of the side surface member and the conductive plate; and a wireless communication circuit electrically connected to the first conductive pattern and the second conductive pattern and configured to transmit and/or receive a signal having a designated frequency.

According to various embodiments, an electronic device may include: a housing including a front plate a rear plate facing in the opposite direction to the front plate, and a side surface member surrounding a space between the first plate and the rear plate, the side surface member including a first side surface extending in a first direction and having a first length, a second side surface extending in a second direction perpendicular to the first direction and having a second length longer than the length, a third side surface extending parallel to the first side surface and having the first length, and a fourth side surface extending parallel to the second side surface and having the second length; a display arranged between the front plate and the rear plate, having at least a partial region exposed through the front plate, and including a conductive plate; a printed circuit board arranged between the display and the rear plate and including at least one conductive layer, the at least one conductive layer being electrically connected to the conductive plate; a first conductive pattern arranged between the printed circuit board and the rear plate; a second conductive pattern arranged between the printed circuit board and the front plate and, when viewed from above the front plate, between the first side surface of the side surface member and the conductive plate; and a wireless communication circuit electrically connected to the first conductive pattern and the second conductive pattern and configured to transmit and/or receive a signal having a designated frequency. The second conductive pattern may be electrically directly coupled to a portion of the printed circuit board, which is connected to the wireless communication circuit.

Advantageous Effects of invention

Various embodiments of the disclosure may implement an antenna wherein at least a partial region of a conductive plate of the display is electrically connected to a conductive layer (for example, ground) of the printed circuit board, thereby preventing parasitic resonance from occurring in bands other than a desired operating band, and wherein the antenna operates in multiple bands by means of a conductive pattern.

BEST MODE FOR CARRYING OUT THE INVENTION

Figure 1:
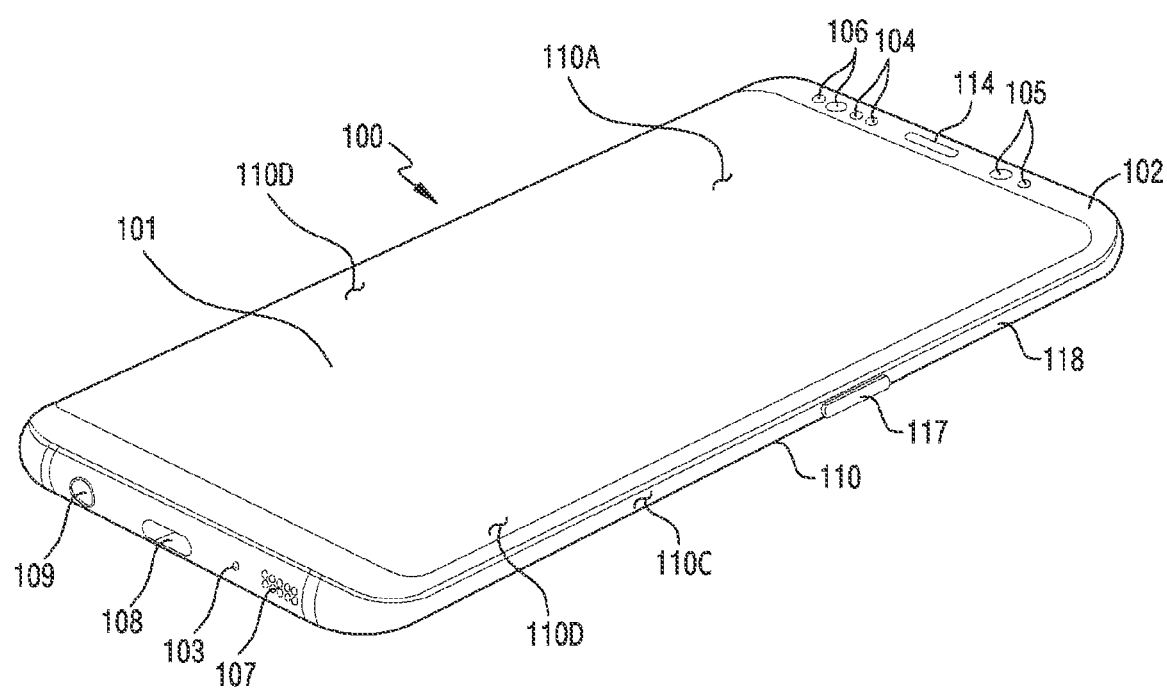
FIG. 1 is a front perspective view of a mobile electronic device according to various embodiments of the disclosure.
Figure 2:
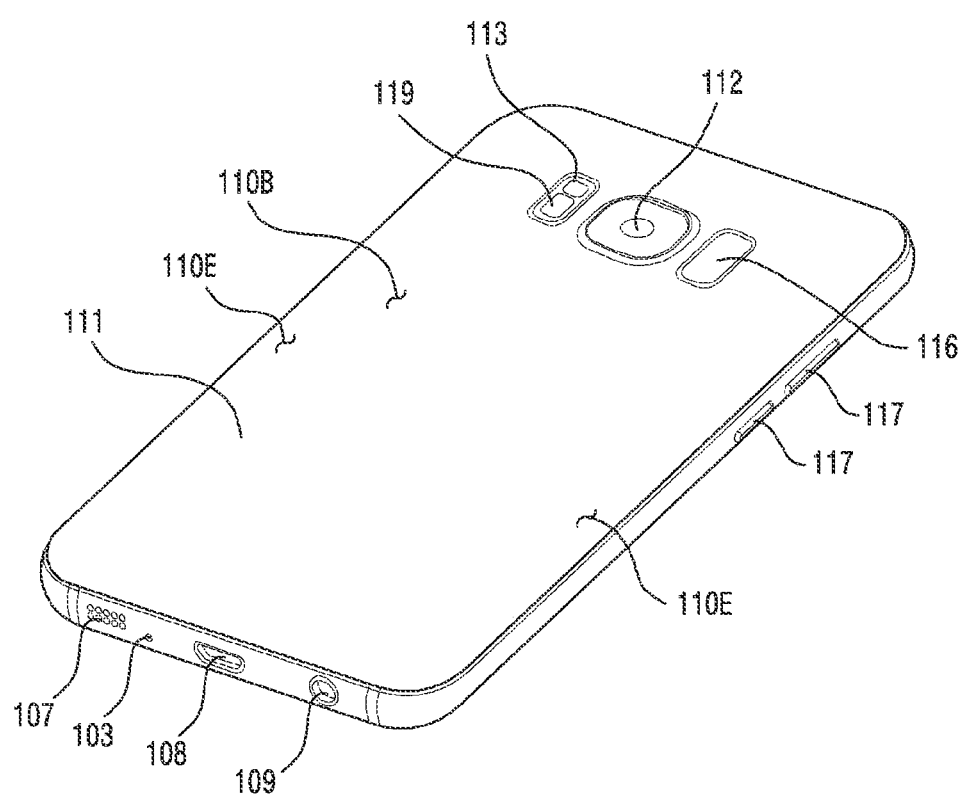
FIG. 2 is a rear perspective view of the electronic device of FIG. 1 according to various embodiments of the disclosure.

FIG. 1 is a front perspective view of a mobile electronic device 100 according to various embodiments of the disclosure and FIG. 2 is a rear perspective view of the electronic device 100 according to various embodiments of the disclosure.

Referring to FIGS. 1 and 2, the electronic device 100 according to an embodiment may include a housing 110 including a first surface 110A (or front surface), a second surface 110B (or rear surface), and a side surface 110C surrounding a space between the first surface 110A and the second surface 110B. In another embodiment (not shown), a structure configuring a part of the first surface 110A of FIG. 1, the second surface 110B, and the side surfaces 110C may be referred to as a housing. According to an embodiment, the first surface 110A may be formed by a front plate 102 (e.g., a glass plate or a polymer plate including various coating layers) having at least a portion which is substantially transparent. The second surface 110B may be formed by a rear plate 111 which is substantially opaque. The rear plate 111 is formed by, for example, coated or colored glass, ceramic, a polymer, a metal (e.g., aluminum, stainless steel (STS), or magnesium), or a combination of at least two thereof. The side surface 110C may be formed by a side bezel structure 118 (or "side surface member") coupled to the front plate 102 and the rear plate 111 and including a metal and/or a polymer. In an embodiment, the rear plate 111 and side bezel structure 118 may be integrally formed and include the same material (e.g., a metal material such as aluminum).

In the illustrated embodiment, the front plate 102 may include two first regions 110D, which are arranged at opposite ends of the longer edges of the front surface plate 102, respectively, and are curved and seamlessly extend from the first surface 110A toward the rear plate 111. In the illustrated embodiment (see FIG. 2), the rear plate 111 may include two second regions 110E arranged at opposite ends of a longer edges of the rear plate, respectively, and are curved and seamlessly extend from the second surface 110B toward the front plate 102. In an embodiment, the front plate 102 (or the rear plate 111) may include only one of the first regions 110D (or the second regions 110E). In another embodiment, the electronic device may not include one of the first regions 110D or the second regions 110E. In the above embodiments, when the electronic device 100 is viewed from the side thereof, the side bezel structure 118 may have a first thickness (or width) on a side surface which does not include the first regions 110D or the second regions 110E, and may have a second thickness, which is thinner than the first thickness, on a side surface including the first regions 110D or the second regions 110E.

According to an embodiment, the electronic device 100 may include at least one of a display 101, audio modules 103, 107, and 114, sensor modules 104, 116, and 119, camera modules 105, 112, and 113, key input devices 117, a light-emitting element 106, and connector holes 108 and 109. In an embodiment, at least one of the elements (e.g., key input devices 117 or the light-emitting element 106) may be omitted from the electronic device 100 or another element may be added to the electronic device 100.

According to an embodiment, the display 101 may be exposed, for example, through a significant portion of the front plate 102. In an embodiment, at least a portion of the display 101 may be exposed through the front plate 102 forming the first surface 110A and the first regions 110D of the side surface 110C. In an embodiment, the edge of the display 101 may be configured to have substantially the same shape as the outer edge of the front plate 102 adjacent thereto. In another embodiment (not shown), in order to expand an area where the display 101 is exposed, the display 101 may be configured such that the distance between the outer edge of the display 101 and the outer edge of the front plate 102 is maintained to be substantially the same.

In another embodiment (not shown), a portion of a screen display region of the display 101 may have a recess or opening disposed thereon and include at least one of the audio module 114, the sensor module 104, the camera module 105, and the light-emitting element 106 which are aligned with the recess or the opening. In another embodiment (not shown), the rear surface of the screen display region of the display 101 may include at least one of the audio module 114, the sensor module 104, the camera module 105, a fingerprint sensor 116, and the light-emitting element 106. In another embodiment (not shown), the display 101 may be coupled or adjacent to a touch sensing circuit, a pressure sensor capable of measuring the intensity (pressure) of touch, and/or a digitizer for detecting a magnetic field type stylus pen. In an embodiment, at least a portion of the sensor modules 104 and 119, and/or at least a portion of the key input device 117 may be disposed on the first regions 110D and/or the second regions 110E.

The audio modules 103, 107, and 114 may include a microphone hole 103 and speaker holes 107 and 114. The microphone hole 103 may include a microphone disposed inside thereof so as to acquire external sound, and in an embodiment, may include a plurality of microphones arranged inside thereof so as to sense the direction of sound.

The speaker holes 107 and 114 may include an external speaker hole 107 and a call receiver hole 114. In an embodiment, the speaker holes 107 and 114 and the microphone hole 103 may be implemented as one hole, or a speaker may be provided without the speaker holes 107 and 114 (e.g., piezo speaker).

The sensor modules 104, 116, and 119 may generate an electrical signal or a data value corresponding to, for example, an internal operating state of the electronic device 100 or an external environmental state. The sensor modules 104, 116, and 119 may include, for example, a first sensor module 104 (e.g., proximity sensor) and/or a second sensor module (not shown) (e.g., fingerprint sensor) disposed on the first surface 110A of the housing 110, and/or a third sensor module 119 (e.g., HRM sensor) and/or a fourth sensor module 116 (e.g., fingerprint sensor) disposed on the second surface 110B of the housing 110. The fingerprint sensor may be disposed not only on the first surface 110A (e.g., display 101) of the housing 110 but also on the second surface 110B thereof. The electronic device 100 may further include a sensor module which is not shown, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include, for example, a first camera device 105 disposed on the first surface 110A of the electronic device 100, a second camera device 112 and/or a flash 113 disposed on the second surface 110B of the electronic device 100. The camera modules 105 and 112 may include one or more lenses, an image sensor, and/or an image signal processor. The flash 113 may include, for example, a light-emitting diode or a xenon lamp. In an embodiment, two or more lenses (infrared camera, wide-angle and telephoto lenses) and image sensors may be disposed on one surface of the electronic device 100.

The key input devices 117 may be disposed on the side surface 110C of the housing 110. In another embodiment, the electronic device 100 may not include one or all of the key input devices 117 mentioned above, and the key input device 117 that is not included on the electronic device 100 may be implemented as another form, such as a soft key or the like, on the display 101. In an embodiment, the key input device may include the sensor module 116 disposed on the second surface 110B of the housing 110.

The light-emitting device 106 may be disposed, for example, on the first surface 110A of the housing 110. The light-emitting element 106 may provide, for example, state information of the electronic device 100, in the light form. In another embodiment, the light-emitting device 106 may provide, for example, a light source interworking with the operation of the camera module 105. The light-emitting element 106 may include, for example, an LED, an IR LED, and a xenon lamp.

The connector holes 108 and 109 may include a first connector hole 108 that can receive a connector (for example, USB connector) for transmitting and receiving power and/or data to and from an external electronic device and/or a second connector 109 (for example, earphone jack) that can receive a connector for transmitting and receiving an audio signal to and from an external electronic device.

Figure 3:
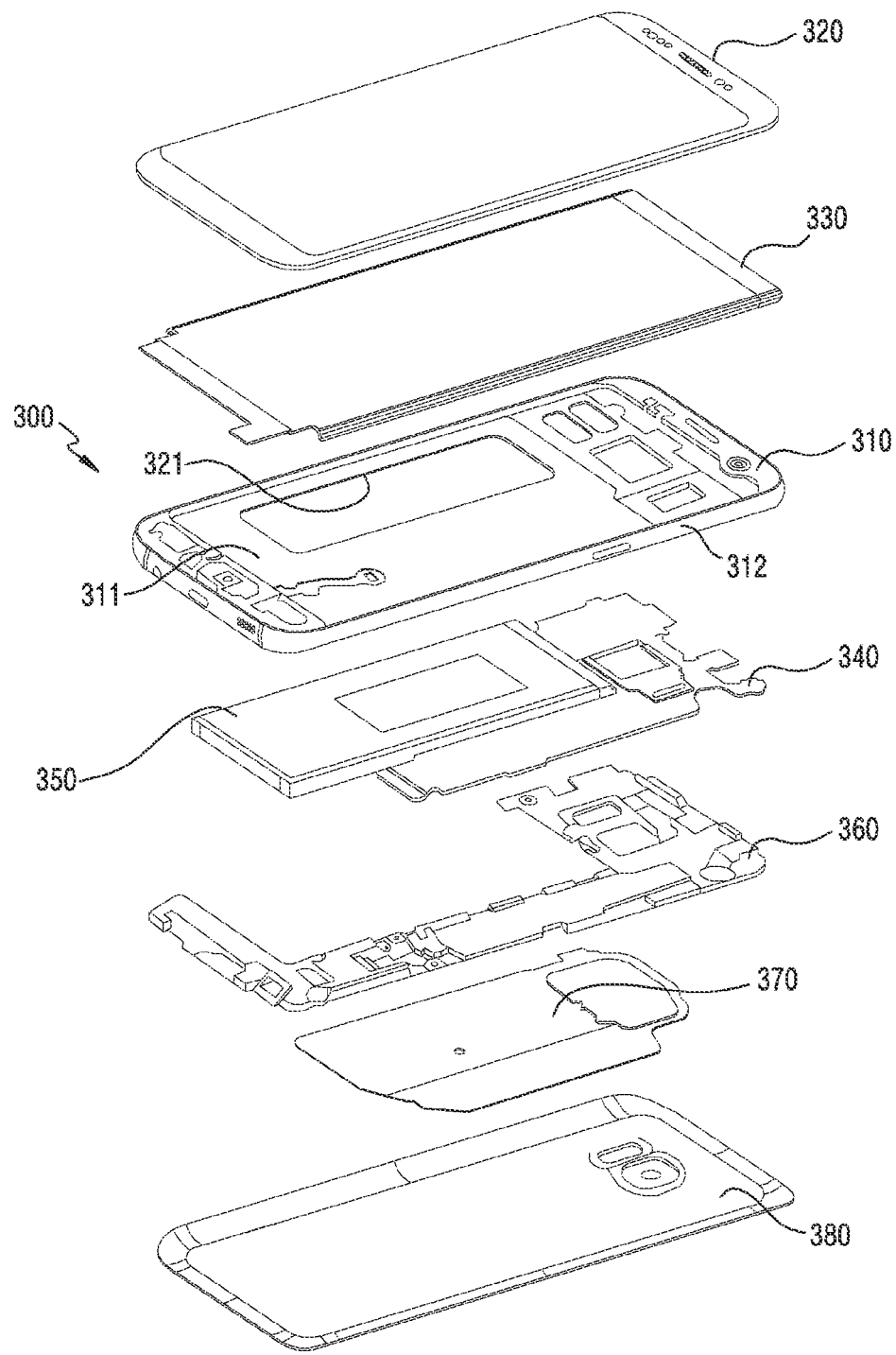
FIG. 3 is an exploded perspective view of the electronic device of FIG. 1 according to various embodiments of the disclosure.

FIG. 3 is an exploded perspective view or the electronic device 100 or FIG. 1 according to various embodiments of the disclosure.

Referring to FIG. 3, the electronic device 300 (e.g., the electronic device 100 of FIG. 1) may include a side bezel structure 310 (e.g., the side bezel structure 118 of FIG. 2), a first support member 311 (e.g., bracket), a front plate 320 (e.g., the front plate 102 of FIG. 1), a display 330 (e.g., the display 101 of FIG. 1), a printed circuit board 340, a battery 350, a second support member 360 (e.g., rear case), an antenna 370, and a rear plate 380 (e.g., the rear plate 111 of FIG. 2). In an embodiment, at least one of the elements (e.g., the first support member 311 or the second support member 360) may be omitted from the electronic device 300 or another element may be added to the electronic device 300. At least one of the elements of the electronic device 300 may be the same as or similar to at least one of the elements of the electronic device 100 of FIG. 1 or 2 and overlapping description thereof will be omitted.

The first support member 311 may be disposed inside the electronic device 300 and connected to the side bezel structure 310 or may be integrally configured with the side bezel structure 310. The first support member 311 may be formed of, for example, a metal material and/or a non-metal (e.g., polymer) material. The first support member 311 may have one surface coupled to the display 330 and the other surface coupled to the printed circuit board 340. The printed circuit board 340 may be equipped with a processor, a memory, and/or an interface. The processor may include, for example, one or more of a central processing unit, an application processor, a graphic processing unit, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, an SD card interface, and/or an audio interface. The interface may, for example, electrically or physically connect the electronic device 300 to an external electronic device and may include a USB connector, an SD card/MMC connector, or an audio connector.

The battery 350, which is a device for supplying power to at least one element of the electronic device 300, may include, for example, a non-rechargeable primary cell, a rechargeable secondary cell, or a fuel battery. At least a portion of the battery 350 may be disposed on, for example, substantially the same plane as the printed circuit board 340. The battery 350 may be integrally disposed inside the electronic device 300 or may be disposed to be attachable to or detachable from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may, for example, perform local area communication with an external device or wirelessly transmit and receive power required for charging. In another embodiment, the antenna structure may be configured by the side bezel structure 310 and/or a portion of the first support member 311 or a combination thereof.

According to various embodiments of the disclosure, at least a portion of the side bezel structure 310 may be formed of a conductive material. According to an embodiment, the side bezel structure 310 may include a side surface member 312 forming at least a portion of the external appearance of the electronic device. According to an embodiment, at least a portion of the side surface member 312 may be disposed along the periphery of the electronic device 300 to be exposed to the outside.

Figure 4:
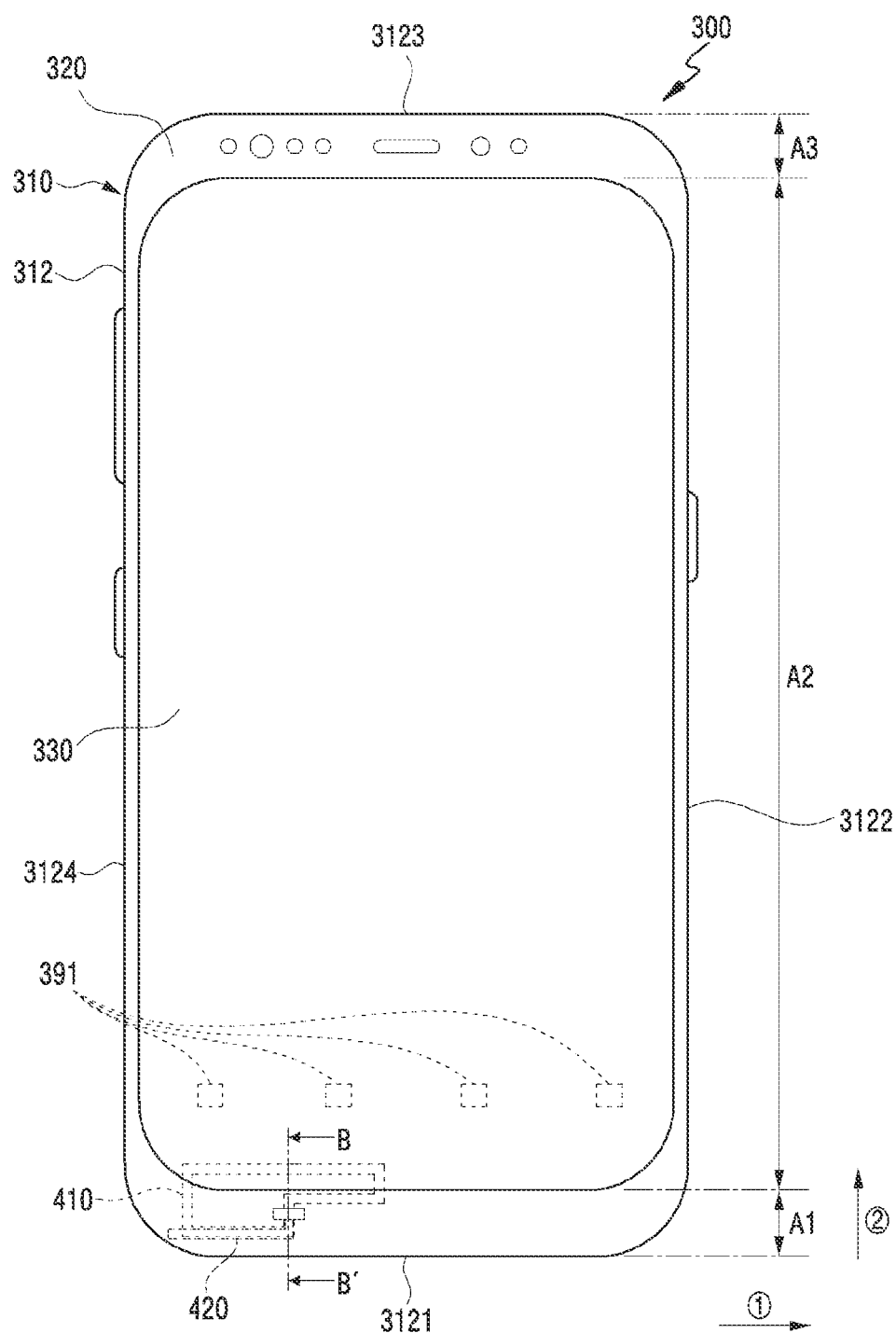
FIG. 4 is a block diagram of an electronic device, showing an arrangement of an antenna according to various embodiments of the disclosure.

FIG. 4 is a block diagram of an electronic device 300, showing an arrangement of an antenna according to various embodiments of the disclosure.

Referring to FIG. 4, the electronic device 300 may include the side bezel structure 310 (e.g., a housing) and a front plate 320 disposed at the side bezel structure 310. According to an embodiment, the side bezel structure 310 may include the side surface member 312 forming the external appearance of the electronic device 300. According to an embodiment, the electronic device 300 may include a display 330 disposed in an inner space thereof and arranged to be exposed to the outside through at least a partial region of the front plate 320. According to an embodiment, the electronic device 300 may include an exposed display region (region A2) exposed to the outside from the front plate 320 and at least one peripheral region (region A1 and region A3) extending from the exposed display region (region A2). According to an embodiment, the at least one peripheral region (region A1 and region A3) may include a first peripheral region (region A1) (e.g., a lower peripheral region) extending from the display exposed region (region A2) to one side and a second peripheral region (region A3) (e.g., an upper peripheral region) extending from the display exposed region to the other side. According to an embodiment, the first peripheral region (region A1) and the second peripheral region (region A3) may include a black matrix (BM) region.

According to various embodiment, the side surface member 312 may include: a first side surface 3121 extending in a first direction (direction ①) and having a first length; a second side surface 3122 extending in a second direction (direction ②) perpendicular to the direction and having a second length longer than the first length; a third side surface 3123 extending parallel to the first side surface 3121 and having the first length; and a fourth side surface 3124 extending parallel to the second side surface 3122 and having the second length.

According to various embodiments, the electronic device 300 may include at least one of conductive patterns 410 and 420 used as an antenna radiator. According to an embodiment, the conductive patterns 410 and 420 may be disposed adjacent to the exposed display region A2. According to an embodiment, the conductive patterns 410 and 420 may include a first conductive pattern 410 formed on a carrier disposed inside the electronic device 300 (e.g., the carrier 390 of FIG. 5A) (e.g., an ejected product) and a second conductive pattern 420 disposed in the inner space of the electronic device 300 and placed at a position overlapping with the first peripheral region (region A1) when the front plate 320 is viewed from the top thereof. According to an embodiment, the first conductive pattern 410 may be electrically connected to a wireless communication circuit (e.g., the wireless communication circuit 341 of FIG. 5B) of a printed circuit board (e.g., the printed circuit board 340 of FIG. 5A), and the second conductive pattern 420 may be capacitively coupled or directly connected to at least a portion of the first conductive pattern 410. According to an embodiment, a wireless communication circuit (e.g., the wireless communication circuit 341 of FIG. 5B) may be configured to transmit and/or receive a first signal operating in a first frequency band, through a first conductive pattern 410 disposed on a carrier (e.g., the carrier 390 of FIG. 5A). According to an embodiment, the wireless communication circuit (e.g., the wireless communication circuit 341 of FIG. 5B) may be configured to transmit or receive a second signal operating in a second frequency band, through the second conductive pattern 420. According to an embodiment, the first frequency band may include a low band (e.g., 0.7 GHz to 1 GHz), and the second frequency band may include a mid-band (e.g., 1.7 GHz to 2.0 GHz). According to an embodiment, the first conductive pattern 410 or the second conductive pattern 420 may be disposed at a position adjacent to the first side surface 3121 of the electronic device 300. In another embodiment, the first conductive pattern 410 or the second conductive pattern 420 may be disposed at a position adjacent to at least one of the second side surface 3122, the third side surface 3123, or the fourth side surface 3124.

According to various embodiments, the electronic device 300 may include a conductive plate (e.g., the conductive plate 331 of FIG. 5A) disposed between the display 330 and the printed circuit board (e.g., the printed circuit board of FIG. 3). At least a partial region of the conductive plated may be electrically coupled to a conductive layer (e.g., ground) of the printed circuit board (e.g., the printed circuit board of FIG. 5A). According to an embodiment, the electronic device 300 may include a first conductive connection member (e.g., the first connection member 391 of FIG. 5A) for electrically connecting the conductive plate and the conductive layer of the printed circuit board. According to an embodiment, the first conductive connection member (e.g., the first conductive connection member 391 of FIG. 5A) may be disposed near at least one of the first conductive pattern 410 or the second conductive pattern 420.

According to various embodiment, the electronic device 300 may have a ground structure between the conductive plate (e.g., the conductive plate 331 of FIG. 5A) of the display 330 and the conductive layer (e.g., the printed circuit board 340 of FIG. 5A) by means of the first conductive connection member (e.g., the first conductive connection member 391 of FIG. 5A) disposed near at least one of the first conductive pattern 410 or the second conductive pattern 420, so that unnecessary parasitic resonance may be prevented. According to an embodiment, the electronic device 300 may separately have a second conductive pattern 420 electrically connected to the first conductive pattern 410, and thus may include a multi-band antenna operating in a frequency band different from the first conductive pattern 410.

Figure 5A:
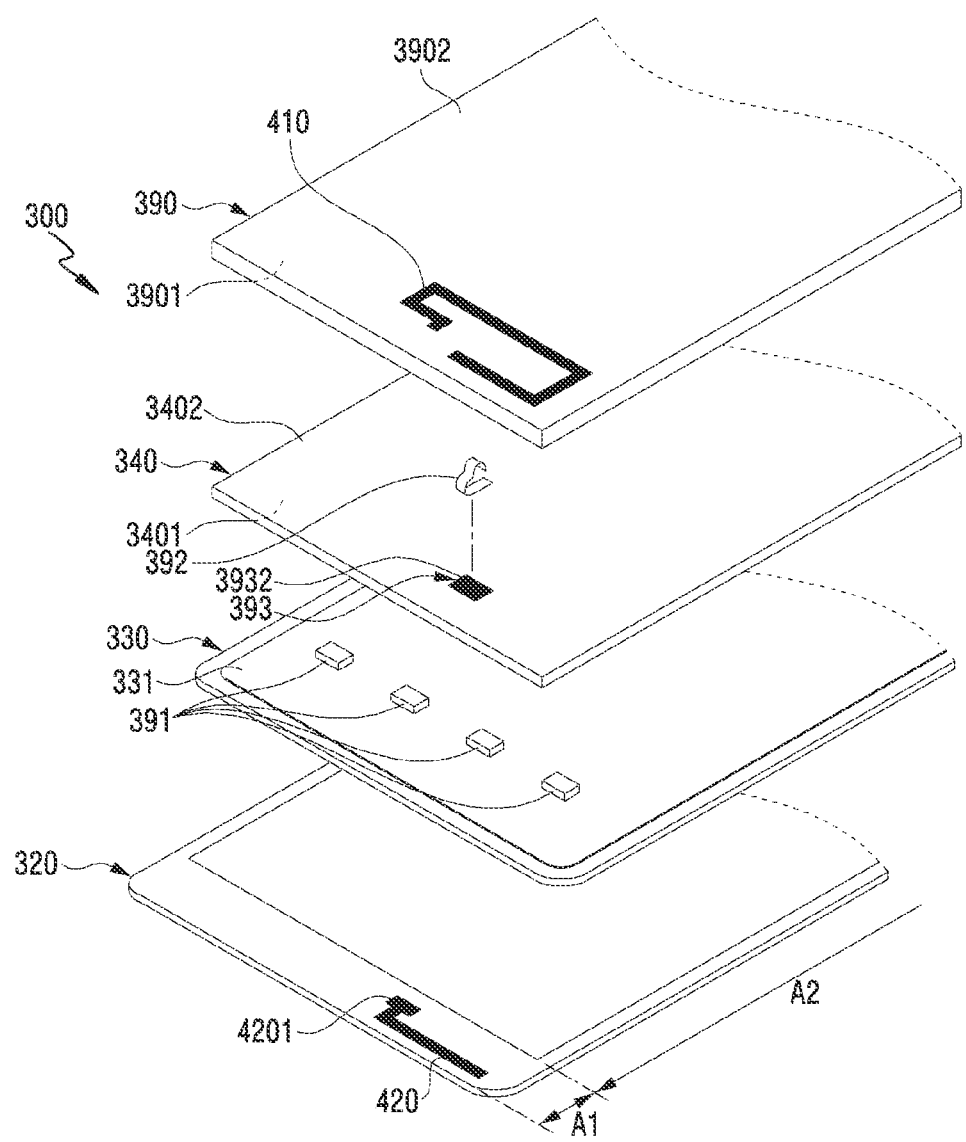
FIG. 5A is an exploded perspective view of an electronic device, showing an arrangement of an antenna according to various embodiments of the disclosure.
Figure 5B:
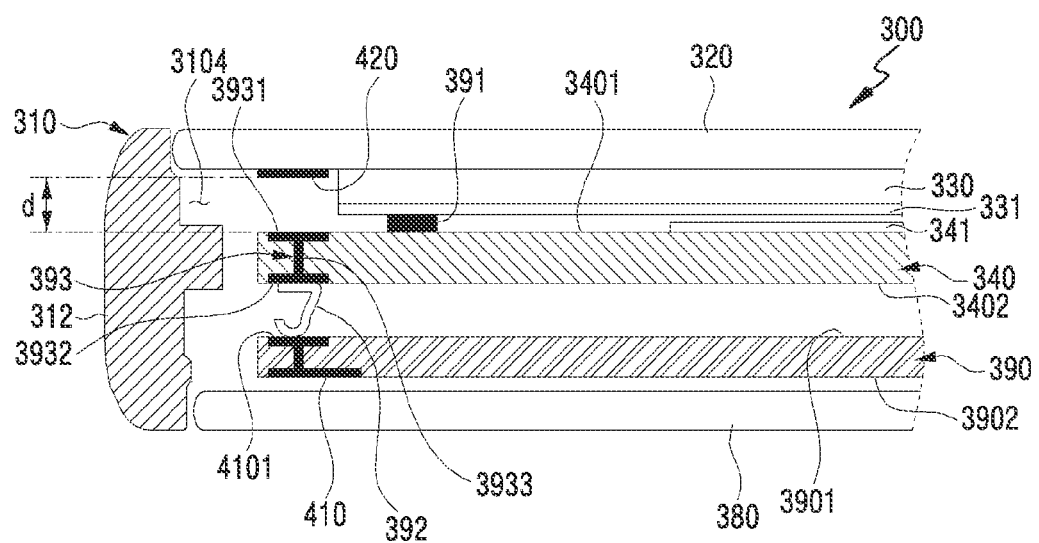
FIG. 5B is a cross-sectional view of a main part of an electronic device, showing an arrangement of an antenna according to various embodiments of the disclosure.

FIG. 5A is an exploded perspective view of an electronic device 300, showing an arrangement of an antenna according to various embodiments of the disclosure. FIG. 5B is a cross-sectional view of a main part of the electronic device 300, showing an arrangement of an antenna according to various embodiments of the disclosure. FIG. 5B is a cross-sectional view taken along line B-B' of FIG. 4.

Referring to FIGS. 5A, and 5B, the electronic device 300 may include a housing 310 (e.g., the side bezel structure 310 of FIG. 3) including a front plate 320, a rear plate 380 facing in the opposite direction to the front plate 320, and a side surface member 312 surrounding a space 3104 between the first plate 320 and the rear plate 380. According to an embodiment, the electronic device 300 may include: the printed circuit board 340 disposed in the above-described space 3104; the display 330 disposed between the front plate 320 and the printed circuit board 340 and having at least a partial region exposed through the front plate 320; the first conductive pattern 410 disposed between the printed circuit board 340 and the rear plate 380; the second conductive pattern 420 placed in the first peripheral region (region A1) and electrically connected to the first conductive pattern 410; or the wireless communication circuit 341 disposed on the printed circuit board 340 and electrically connected to the first conductive pattern 410 and/or the second conductive pattern 420 so as to be configured to transmit and receive signals in at least one frequency band. According to an embodiment, the electronic device 300 may include the conductive plate 331 disposed between the display 330 and the printed circuit board 340. According to an embodiment, the conductive plate 331 may be electrically connected, at at least one point, to the conductive layer of the printed circuit board 340. According to an embodiment, the conductive plate 331 may shield noise and include a metal member for dispersing heat emitted from surrounding heat dissipating components. According to embodiment, the conductive plate 331 may include a Cu sheet.

According to various embodiments, the printed circuit board 340 may include a first substrate surface 3401 facing the front plate 320 and a second substrate surface 3402 facing the rear plate 380. According to an embodiment, the electronic device 300 may include at least one of the first conductive connection members 391 disposed between the first substrate surface 3401 and the conductive plate 331. According to an embodiment, the first conductive connection members 391 may be disposed near the first conductive pattern 410. The first conductive connection members 391 may be mounted at a position electrically connected to the conductive layer of the printed circuit board 340. According to an embodiment, the conductive plate 331 may be disposed by the first conductive connection members 391 to physically contact the conductive layer of the printed circuit board 340 by only the assembly process of the electronic device. According to an embodiment, the first conductive connection members 391 may include at least one of a conductive tape, a conductive foam, a conductive metal piece, or a C-clip. In another embodiment, the first conductive connection members 391 may be mounted on and fixed to the corresponding position of the printed circuit board 340, and then brought into close contact with and electrically connected to the conductive plate 331 during the assembling of the electronic device.

According to various embodiments, the carrier 390 may include a first surface 3901 facing the front plate 320 and a second surface 3902 facing the rear plate 380. According to an embodiment, the carrier 390 may include a dielectric material (e.g., an injection-molding material made of a polymer). According to an embodiment, the first conductive pattern 410 may be disposed on the second surface 3902 of the carrier 390. According to an embodiment, the first conductive pattern 410 may be formed on the carrier 390 by using at least one of a laser direct structure (LDS) method, a conductive paint application method, a FPCB attachment method, or a metal plate attachment method. In another embodiment, the conductive pattern 410 may be disposed on the first surface 3901 of the carrier 390. In another embodiment, the first conductive pattern 410 may be disposed in an inner space between the first surface 3901 of the carrier 390 and the second surface 3902 thereof through insert injection molding. In another embodiment, the first conductive pattern 410 may be disposed in an inner space (e.g., the inner surface of the rear plate) of the electronic device 300 without a separate carrier. In another embodiment, the first conductive pattern 410 may also be replaced by a portion of the side surface members of the electronic device 300, which is formed of a metal member.

According to various embodiments, the second conductive pattern 420 may be disposed between the front plate 320 and the printed circuit board 340. According to an embodiment, the front plate 320 may include an exposed display region (A2) (e.g., the exposed display region (region A2) of FIG. 4) in which the display 330 is disposed, and a first peripheral region (A1) (e.g., the first peripheral region (region A1) of FIG. 4) located around the exposed display region. According to an embodiment, the second conductive pattern 420 may be disposed in the first peripheral region (A1) (e.g., the first peripheral region (region A1) or a second peripheral region (region A3) of FIG. 4) of the front plate 320. According to an embodiment, the second conductive pattern 420 may be formed on the first peripheral region (A1) of the front plate 320 by using at least one of a LDS method, a FPCB attachment method, a conductive paint application method, or a printing method.

According to various embodiments, the first conductive pattern 410 may be electrically connected to the printed circuit board 340 through a second conductive connection member 392 (e.g., a C clip) electrically connected to the printed circuit board 340. According to an embodiment, the printed circuit board 340 may include a third conductive connection member 393 disposed on the printed circuit board 340. According to an embodiment, the second conductive connection member 392 may be electrically connected to the third conductive connection member 393. According to an embodiment, the third conductive connection member 393 may be electrically connected to the wireless communication circuit 341 mounted on the printed circuit board 340. According to an embodiment, the third conductive connection member 393 may include a first conductive pad 3931 exposed from the first substrate surface 3401 of the printed circuit board 340, a second conductive pad 3932 exposed from the second substrate surface 3402 of the printed circuit board 340, and a conductive via 3933 extending from the first conductive pad 3931 to the second conductive pad 3932 through the printed circuit board 340. In another embodiment, the first conductive pad 3931 may also be electrically connected to the second conductive pad 3932 by another conductive connection member bypassing the side surface of the printed circuit board 340.

According to various embodiments, the first conductive pattern 410 may be disposed, through insert injection molding, in the carrier 390 formed of a synthetic resin material. According embodiment, the first conductive pattern 410 may be electrically connected to the second conductive pad 3932 by the second conductive connection member 392 through the third conductive pad 4101 which is exposed from the second surface 3902 to the first surface 3901 through the carrier 390.

According to various embodiments, the second conductive pattern 420 may be disposed in a region other than a region (e.g., the exposed display region (region A2) of FIG. 4) where the display 330 of the front plate 320 is disposed. According to an embodiment, the second conductive pattern 420 may be disposed to be spaced apart from the first conductive pad 3931 by a capacitively couplable distance d. In another embodiment, the second conductive pattern 420 may also be disposed at a position capacitively couplable to the first conductive pad 3931, in the inner space 3104 of the electronic device 300 instead of the front plate 320.

Figure 6:
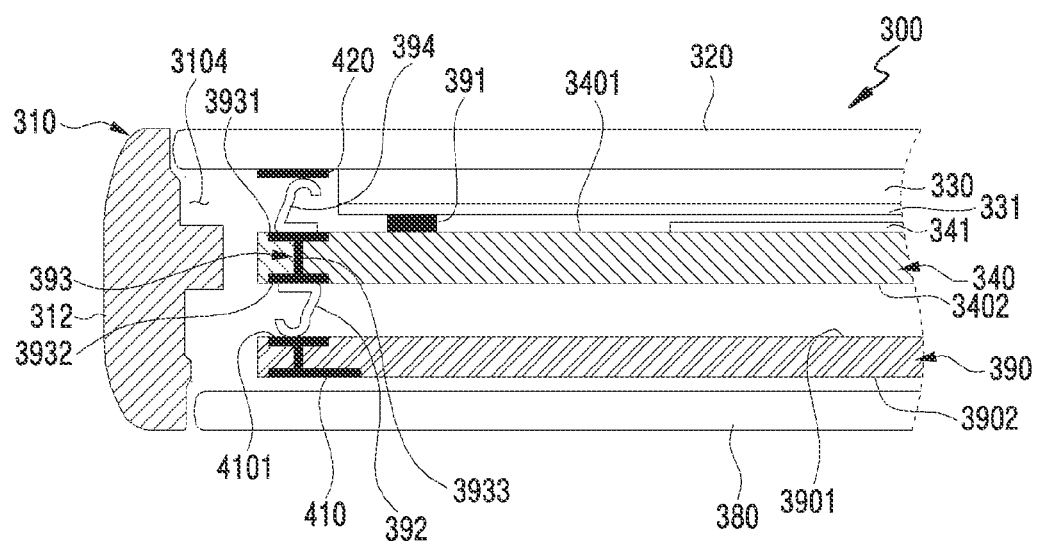
FIG. 6 is a cross-sectional view of a main part of an electronic device, showing an arrangement of an antenna according to various embodiments of the disclosure.

FIG. 6 is a cross-sectional view of a main part of an electronic device 300, showing an arrangement of an antenna according to various embodiments of the disclosure.

As illustrated in FIG. 6, the second conductive pattern 420 may also be disposed to be physically and electrically in contact with the first conductive pad 3931 of the third conductive connection member 393. According to an embodiment, the second conductive pattern 420 may be physically connected to the first conductive pad 3931 through the fourth conductive connection member 394 disposed between the second conductive pattern 420 and the first conductive pad 3931. According to an embodiment, the fourth conductive connection member 394 may include at least one of a conductive tape, a conductive foam, a conductive metal piece, or a C-clip.

According to various embodiments, the electronic device 300 may further include at least one switching device (not shown). According to an embodiment, the electronic device 300 may be configured, by controlling the first switching device (not shown) disposed between the first conductive pattern 410 and the second conductive pad 3932 and a second switching device (not shown) disposed between the first conductive pad 3931 and the second conductive patterns 420, such that the first conductive pattern 410 and/or the second conductive pattern 420 selectively operate. For example, the electronic device 300 may operate only the first conductive pattern 410, operate only the second conductive pattern 420, or operate both the first conductive pattern 410 and the second conductive pattern 410, by using at least one switching device.

Figure 7A:
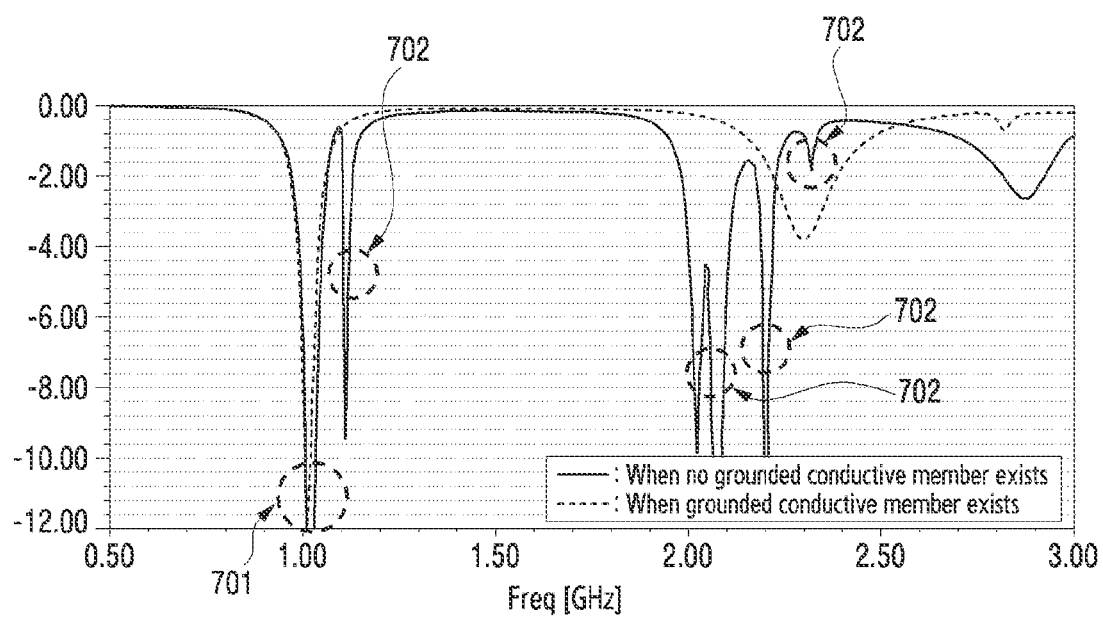
FIG. 7A is an S11 graph illustrating an antenna efficiency comparison between when a grounded conductive plate exists and when no grounded conductive plate exists, according to various embodiments of the disclosure.

FIG. 7A is an S11 graph illustrating an antenna efficiency comparison between when a grounded conductive plate 331 exists and when no grounded conductive plate 331 exists, according to various embodiments of the disclosure.

As noted from FIG. 7A, when the conductive plate (e.g., the conductive plate 331 of FIG. 5B) is not grounded to the printed circuit board (e.g., the printed circuit board 340 of FIG. 5B) through the first conductive connection member (e.g., the first conductive connection member 391 of FIG. 5), a resonant frequency is formed in a low band through the first conductive pattern (e.g., the first conductive pattern 410 of FIG. 5B), but the radiation efficiency decreases due to parasitic resonance formed in the periphery thereof, and when the conductive plate (e.g., the conductive plate 331 of FIG. 5B) is grounded to the printed circuit board, a resonant frequency is formed in a low band through the first conductive pattern (e.g., the first conductive pattern 410 of FIG. 5B) and parasitic resonance in the periphery is eliminated.

Figure 7B:
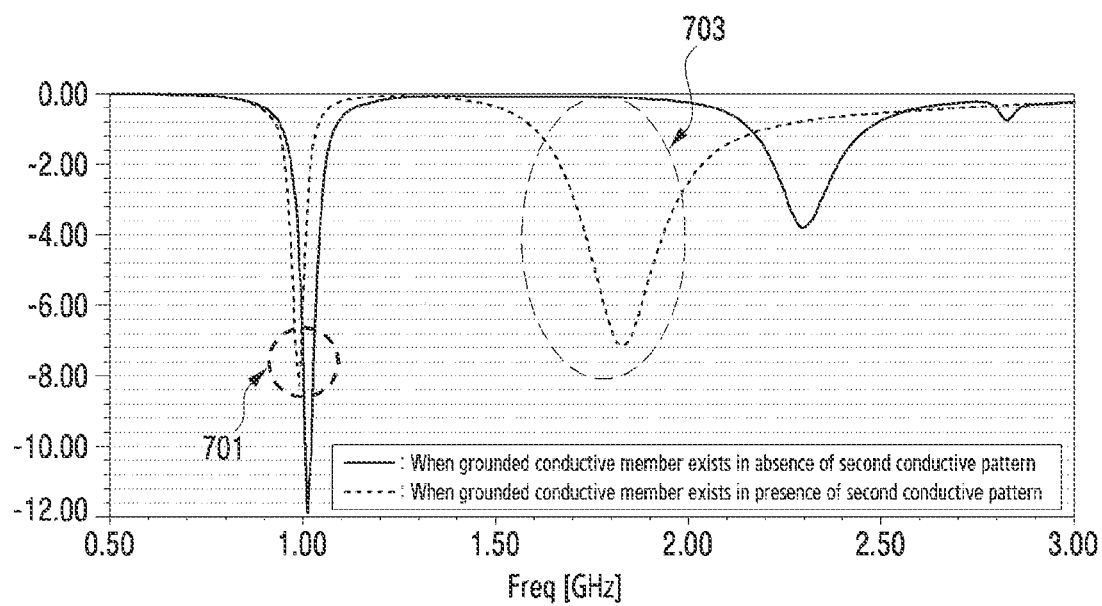
FIG. 7B is an S11 graph illustrating an antenna efficiency comparison between when a second conductive pattern exists and when no second conductive pattern exists, assuming that a grounded conductive plate exists, according to various embodiments of the disclosure.

FIG. 7B is an S11 graph illustrating an antenna efficiency comparison between when a second conductive pattern 420 exists and when no second conductive pattern 420 exists, assuming that the grounded conductive plate 331 exists, according to various embodiments of the disclosure.

As noted from FIG. 7B, when the conductive plate (e.g., the conductive plate 331 of FIG. 5B) is grounded to the printed circuit board (e.g., the printed circuit board 340 of FIG. 5B) through a first conductive connection member (e.g., the first conductive connection member 391 of FIG. 5B), and when the second conductive pattern (e.g., the second conductive pattern 420 in FIG. 5B) is electrically connected to the first conductive pad (e.g., the first conductive pad 3931 of FIG. 5B), a resonant frequency is formed in a low band through the first conductive pattern (e.g., the first conductive pattern 410 of FIG. 5B), and a resonant frequency is formed in a mid-band through the second conductive pattern (e.g., the second conductive pattern 420 of FIG. 5B), thereby enabling efficient operation as a dual-band antenna.

Figure 8:
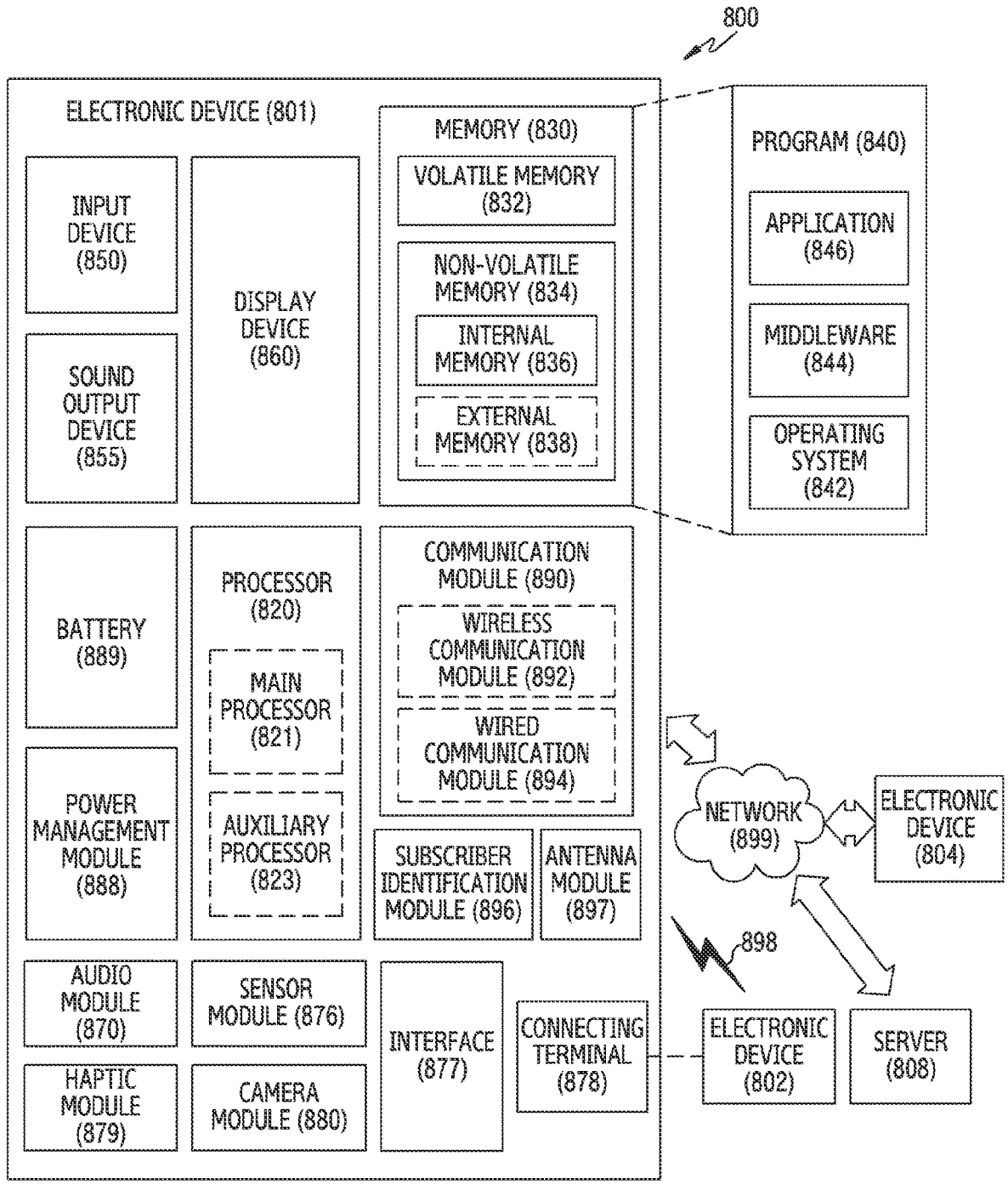
FIG. 8 is a block diagram of an electronic device in a network environment, according to various embodiments of the disclosure.

FIG. 8 is a block diagram of an electronic device 801 (e.g., the electronic device 100 of FIG. 1 or the electronic device 300 of FIG. 3) in a network environment 800, according to various embodiments of the disclosure.

Referring to FIG. 8, the electronic device 801 in the network environment 800 may communicate with an electronic device 802 via a first network 898 (e.g., a short-range wireless communicator network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCP). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to Perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine readable storage medium (e.g., compact disc read only memory ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the electronic device (e.g., the electronic device 300 of FIG. 5B) may include: a housing (e.g., the housing 310 of FIG. 5B) including a front plate (e.g., the front plate 320 of FIG. 5B), a rear plate (e.g., the rear plate 380 of FIG. 5B) facing in the opposite direction to the front plate, and a side surface member (e.g., the side surface member 312 of FIG. 5B) surrounding a space (e.g., the space 3104 of FIG. 5B) between the first plate and the rear plate, the side surface member including a first side surface (e.g., the first side surface 3121 of FIG. 4) extending in a first direction (e.g., the direction ① of FIG. 4) and having a first length, a second side surface (e.g., the second side surface 3122 of FIG. 4) extending in a second direction (e.g., the direction ② of FIG. 4) perpendicular to the first direction and having a second length longer than the first length, a third side surface (e.g., the third side surface 3123 of FIG. 4) extending parallel to the first side surface and having the first length, and a fourth side surface (e.g. the fourth side surface 3124 of FIG. 4) extending parallel to the second side surface and having the second length; a display (e.g., the display 330 of FIG. 5B) arranged between the front plate and the rear plate, having at least a partial region exposed through the front plate, and including a conductive plate (e.g., the conductive plate 331 of FIG. 5B); a printed circuit board (e.g., the printed circuit board 340 of FIG. 5B) arranged between the display and the rear plate and including at least one conductive layer, the at least one conductive layer being electrically connected to the conductive plate; a first conductive pattern (e.g., the first conductive pattern 410 of FIG. 5B) arranged between the printed circuit board and the rear plate; a second conductive pattern (e.g., the second conductive pattern 420 of FIG. 5B) arranged between the printed circuit board and the front plate and, when viewed from above the front plate, between the first side surface of the side surface member and the conductive plate; and a wireless communication circuit electrically connected to the first conductive pattern and the second conductive pattern and configured to transmit and/or receive a signal having a designated frequency.

According to various embodiments, the wireless communication circuit (e.g., the wireless communication circuit 341 of FIG. 5B) may be configured to transmit and/or receive a first signal operating in a first frequency band, through the first conductive pattern (e.g., the first conductive pattern 410 of FIG. 5B), and transmit and/or receive a second signal operating in a second frequency band different from the first frequency, through the second conductive pattern (e.g., the second conductive pattern 420 of FIG. 5B).

According to various embodiments, the first frequency band may include a low band, and the second frequency band may include a mid-band.

According to various embodiments, the electronic device may further include at least one first conductive connection member (e.g., the first conductive connection member 391 of FIG. 5B) disposed between the conductive plate (e.g., the conductive plate 331 of FIG. 5B) and the printed circuit board (e.g., the printed circuit board 340 of FIG. 5B), and the first conductive connection member may be electrically connected to the conductive layer.

According to various embodiments, the at least one first conductive connection member (e.g., the first conductive connection member 391 of FIG. 5B) may be disposed closer to the first side surface than the second side surface.

According to various embodiments, the at least one first conductive connection member (e.g., the first conductive connection member 391 of FIG. 5B) may include at least one of a conductive tape, a conductive foam, a conductive metal piece, or a C-clip.

According to various embodiments, the electronic device may further include a carrier made of a dielectric material and disposed between the printed circuit board (e.g., the printed circuit board 340 of FIG. 5B) and the rear plate (e.g., the rear plate 380 of FIG. 5B), and the first conductive pattern (e.g., the first conductive pattern 410 of FIG. 5B) may be disposed on the carrier.

According to various embodiments, the printed circuit board (e.g., the printed circuit board 340 of FIG. 5B) may include a first substrate surface (e.g., the first substrate surface 3401 of FIG. 5B) facing the front plate (e.g., the front plate 320 of FIG. 5B) and a second substrate surface (e.g., the second substrate surface 3402 of FIG. 5B) facing the rear plate (e.g., the rear plate 380 of FIG. 5B), and the first conductive pattern (e.g., the first conductive pattern 410 of FIG. 5B) may be electrically connected to the portion of the printed circuit board through a second conductive connecting member (e.g., the second conductive connecting member 392 of FIG. 5B).

According to various embodiments, the printed circuit board (e.g., the printed circuit board 340 of FIG. 5B) may include: a first conductive pad (e.g., the first conductive pad 3931 of FIG. 5B) exposed from the first substrate surface (e.g., the first substrate surface 3401 of FIG. 5B) and at least partially over the second conductive pattern, when viewed from above the front plate; a second conductive pad (e.g., the second conductive pad 3932 of FIG. 5B) exposed from the second substrate surface (e.g., the second substrate surface 3402 of FIG. 5B) and at least partially overlapping the first conductive pattern, when viewed from above the front plate; and a third conductive connection member (e.g., the third conductive connection member 393 of FIG. 5B) including a conductive via (e.g., the conductive via 3933 of FIG. 5B) connecting the first conductive pad to the second conductive pad.

According to various embodiments, the first conductive pad (e.g., the first conductive pad 3931 of FIG. 5B) may be spaced apart from and electrically connected to the second conductive pattern (e.g., the second conductive pattern 420 of FIG. 5B).

According to various embodiments, the second conductive connection member (e.g., the second conductive connection pad 392 of FIG. 5B) may include at least one of a conductive tape, a conductive foam, a conductive metal piece, or a C-clip.

According to various embodiments, the front plate (e.g., the front plate 320 of FIG. 5B) may include an exposed display region (e.g., the exposed display region (region A1) of FIG. 4) in which the display (e.g., the display 330 of FIG. 5B) is disposed, and at least one peripheral region (e.g., the at least one peripheral region (region A1 and region A3) of FIG. 4), and the second conductive pattern (e.g., the second conductive pattern 420 of FIG. 5B) may be disposed in the at least one peripheral region on the rear surface of the front plate.

According to various embodiments, when viewed from above the front plate, a portion between the first side surface of the side surface member and the conductive plate may overlap at least a part of black matrix (BM) region.

According to various embodiments, the second conductive pattern (e.g., the second conductive pattern 420) may be formed using, at least one of a LDS method, a FPCB attachment method, a conductive paint application method, or a printing method.

According to various embodiments, the electronic device may include a first switching device disposed on an electrical path between the wireless communication circuit (e.g., the wireless communication circuit 341 of FIG. 5B) and the first conductive pattern (e.g., the first conductive pattern 410 of FIG. 5B), and a second switching device disposed on an electrical path between the wireless communication circuit and the second conductive pattern (e.g., the second conductive pattern 420 of FIG. 5B), and the first conductive pattern and the second conductive pattern may be selectively operated through control by the first switching device and second switching device.

According to various embodiments, the electronic device (e.g., the electronic device 300 of FIG. 5B) may include: a housing (e.g., the housing 310 of FIG. 5B) including a front plate (e.g., the front plate 320 of FIG. 5B), a rear plate (e.g., the rear plate 380 of FIG. 5B) facing in the opposite direction to the front plate, and a side surface member (e.g., the side surface member 312 of FIG. 5B) surrounding a space (e.g., the space 3104 of FIG. 5B) between the first plate and the rear plate, the side surface member including a first side surface (e.g., the first side surface 3121 of FIG. 4) extending in a first direction (e.g., the direction ① of FIG. 4) and having a first length, a second side surface (e.g., the second side surface 3122 of FIG. 4) extending in a second direction (e.g., the direction ② of FIG. 4) perpendicular to the first direction and having a second length longer than the first length, a third side surface (e.g., the third side surface 3123 of FIG. 4) extending parallel to the first side surface and having the first length, and a fourth side surface (e.g. the fourth side surface 3124 of FIG. 4) extending parallel to the second side surface and having the second length; a display (e.g., the display 330 of FIG. 5B) arranged between the front plate and the rear plate, having at least a partial region exposed through the front plate, and including a conductive plate (e.g., the conductive plate 331 of FIG. 5B); a printed circuit board (e.g., the printed circuit board 340 of FIG. 5B) arranged between the display and the rear plate and including at least one conductive layer, the at least one conductive layer being electrically connected to the conductive plate; a first conductive pattern (e.g., the first conductive pattern 410 of FIG. 5B) arranged between the printed circuit board and the rear plate; a second conductive pattern (e.g., the second conductive pattern 420 of FIG. 5B) arranged between the printed circuit board and the front plate and, when viewed from above the front plate, between the first side surface of the side surface member and the conductive plate; and a wireless communication circuit electrically connected to the first conductive pattern and the second conductive pattern and configured to transmit and/or receive a signal having a designated frequency. The second conductive pattern may be electrically and directly connected to a portion of the printed circuit board connected to the wireless communication circuit.

According to various embodiments, the wireless communication circuit (e.g., the wireless communication circuit 341 of FIG. 5B) may be configured to transmit and/or receive a first signal operating in a first frequency band, through the first conductive pattern (e.g., the first conductive pattern 410 of FIG. 5B), and transmit and/or receive a second signal operating in a second frequency band different from the first frequency, through the second conductive pattern (e.g., the second conductive pattern 420 of FIG. 5B).

According to various embodiments, the first frequency band may include a low band, and the second frequency band may include a mid-band.

According to various embodiments, the electronic device may further include at least one first conductive connection member (e.g., the first conductive connection member 391 of FIG. 5B) disposed between the conductive plate (e.g., the conductive plate 331 of FIG. 5B) and the printed circuit board (e.g., the printed circuit board 340 of FIG. 5B), and the first conductive connection member may be electrically connected to the conductive layer.

According to various embodiments, the front plate (e.g., the front plate 320 of FIG. 5B) may include an exposed display region (e.g., the exposed display region (region A1) of FIG. 4) in which the display is disposed, and at least one peripheral region (e.g., the at least one peripheral region (region A1 and region A2) of FIG. 4), and the second conductive pattern (e.g., the second conductive pattern 420 of FIG. 5B) may be disposed in the at least one peripheral region on the rear surface of the front plate.

The embodiments of the disclosure disclosed in the specification and the drawings have been presented to easily explain technical contents according to the embodiments of disclosure and help comprehension of the disclosure, and do not limit the scope of the embodiments of the disclosure. Therefore, the scope of the various embodiments of the disclosure should be construed that all changes or modified forms derived based on the technical idea of various embodiments of the disclosure in addition to the embodiments disclosed herein are included in the scope of the various embodiments of the disclosure.

The invention claimed is:

1. An electronic device comprising:
a housing comprising a front plate, a rear plate facing in an opposite direction to the front plate, and a side surface member surrounding a space between the front plate and the rear plate,
wherein the side surface member comprises a first side surface extending in a first direction and having a first length, a second side surface extending in a second direction perpendicular to the first direction and having a second length larger than the first length, a third side surface extending in parallel to the first side surface and having the first length, and a fourth side surface extending in parallel to the second side surface and having the second length;
a display arranged between the front plate and the rear plate, having at least a partial region exposed through the front plate, and comprising a conductive plate;
a printed circuit board arranged between the display and the rear plate and comprising at least one conductive layer,
wherein the conductive layer and the conductive plate are electrically connected to each other;
a first conductive pattern arranged between the printed circuit board and the rear plate;
a second conductive pattern arranged between the printed circuit board and the front plate and, when viewed from above the front plate, between the first side surface of the side surface member and the conductive plate; and
a wireless communication circuit configured to transmit and/or receive a signal having a designated frequency using the first conductive pattern and the second conductive pattern,
wherein the printed circuit board comprises;
a first conductive pad exposed from a first surface of the printed circuit board, the first surface facing the rear plate,
a second conductive pad exposed from a second surface of the printed circuit board, the second surface facing the front plate, and
a conductive via electrically connecting the first conductive pad and the second conductive pad, and
wherein the wireless communication circuit is electrically connected to the first conductive pattern through the first conductive pad and is electrically connected to the second conductive pattern through the second conductive pad.

2. The electronic device of claim 1, wherein the wireless communication circuit is configured to transmit and/or receive a first signal operating in a first frequency band, through the first conductive pattern, and transmit and/or receive a second signal operating in a second frequency band different from the first frequency band, through the second conductive pattern.

3. The electronic device of claim 2, wherein the first frequency band comprises a low band, and the second frequency band comprises a mid-band.

4. The electronic device of claim 1, further comprising at least one first conductive connection member disposed between the conductive plate and the printed circuit board, wherein the first conductive connection member is electrically connected to the conductive layer.

5. The electronic device of claim 4, wherein the at least one first conductive connection member is disposed closer to the first side surface than the second side surface.

6. The electronic device of claim 4, wherein the at least one first conductive connection member comprises at least one of a conductive tape, a conductive foam, a conductive metal piece, or a C-clip.

7. The electronic device of claim 1, further comprising a carrier made of a dielectric material and disposed between the printed circuit board and the rear plate,
   wherein the first conductive pattern is disposed on the carrier.

8. The electronic device of claim 7, wherein the
   first conductive pattern is electrically connected to the printed circuit board through a second conductive connecting member.

9. The electronic device of claim 8, wherein the
   first conductive pad at least partially overlaps the first conductive pattern when viewed from above the front plate, and
   wherein the second conductive pad at least partially overlaps the second conductive pattern when viewed from above the front.

10. The electronic device of claim 9, wherein the second conductive pad is spaced apart from and electrically connected to the second conductive pattern.

11. The electronic device of claim 9, wherein the second conductive connection member comprises at least one of a conductive tape, a conductive foam, a conductive metal piece, or a C-clip.

12. The electronic device of claim 1, wherein the front plate comprises an exposed display region in which the display is disposed, and at least one peripheral region, and
   the second conductive pattern is disposed in the at least one peripheral region on the rear surface of the front plate.

13. The electronic device of claim 1, wherein, when viewed from above the front plate, a portion between the first side surface of the side surface member and the conductive plate overlaps at least a part of black matrix (BM) region.

14. The electronic device of claim 1, wherein the second conductive pattern is formed using at least one of a LDS method, a FPCB attachment method, a conductive paint application method, or a printing method.

15. The electronic device of claim 1, comprising:
   a first switching device disposed on an electrical path between the wireless communication circuit and the first conductive pattern; and
   a second switching device disposed on an electrical path between the wireless communication circuit and the second conductive pattern,
   wherein the first conductive pattern and the second conductive pattern are selectively operated through control by the first switching device and second switching device.

* * * * *